US011979209B2

(12) United States Patent
Park et al.

(10) Patent No.: US 11,979,209 B2
(45) Date of Patent: May 7, 2024

(54) ELECTRONIC DEVICE WITH ANTENNAS AND METHOD OF THE SAME

(71) Applicant: Samsung Electronics Co., Ltd., Suwon-si (KR)

(72) Inventors: Sungchul Park, Suwon-si (KR); Boon Loong Ng, Santa Clara, CA (US); Suha Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/828,512

(22) Filed: May 31, 2022

(65) Prior Publication Data

US 2022/0360301 A1    Nov. 10, 2022

Related U.S. Application Data

(63) Continuation of application No. PCT/KR2022/006328, filed on May 3, 2022.

(Continued)

(30) Foreign Application Priority Data

Aug. 4, 2021  (KR) .................. 10-2021-0102559

(51) Int. Cl.
*H04B 7/04* (2017.01)
*H04B 7/0456* (2017.01)
(Continued)

(52) U.S. Cl.
CPC ......... *H04B 7/0473* (2013.01); *H04B 7/0608* (2013.01); *H04B 7/0628* (2013.01); *H04B 7/0854* (2013.01)

(58) Field of Classification Search
CPC .. H04B 7/0473; H04B 7/0608; H04B 7/0628; H04B 7/0854
See application file for complete search history.

(56) References Cited

U.S. PATENT DOCUMENTS 10,236,951 B2    3/2019  Park et al.
2013/0107791 A1  5/2013  Oh et al.
(Continued)

FOREIGN PATENT DOCUMENTS

EP           3282749 B1      12/2019
KR    10-2013-0127376 A      11/2013
(Continued)

OTHER PUBLICATIONS

ETSI TS 136 300 V9.2.0 (Feb. 2010) LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), online: https://www.etsi.org/deliver/etsi_ts/136300_136399/136300/09.02.00 (Year: 2010).*

(Continued)

*Primary Examiner* — Nader Bolourchi
(74) *Attorney, Agent, or Firm* — Jefferson IP Law, LLP

(57) ABSTRACT

An electronic device is provided. The electronic device includes a plurality of antennas, communication circuit, and a processor operatively connected to the communication circuit. The processor may be configured to transmit capability information of the electronic device to a base station, transmit channel state information measured based on a reference signal received through the plurality of antennas from the base station, receive antenna control information determined based on at least one of the capability information and the channel state information from the base station, and drive the plurality of antennas by selecting one of a polarization multiple-input multiple-output (MIMO) mode and a spatial MIMO mode based on the antenna control information.

20 Claims, 12 Drawing Sheets

Related U.S. Application Data

(60) Provisional application No. 63/186,405, filed on May 10, 2021.

(51) Int. Cl.
*H04B 7/06* (2006.01)
*H04B 7/08* (2006.01)

(56) References Cited

U.S. PATENT DOCUMENTS

| | | |
|---|---|---|
| 2013/0301454 A1 | 11/2013 | Seol et al. |
| 2014/0294106 A1 | 10/2014 | Cordeiro et al. |
| 2014/0378105 A1 | 12/2014 | Suryavanshi |
| 2018/0049046 A1 | 2/2018 | Lunttila et al. |
| 2020/0314934 A1 | 10/2020 | Raghavan et al. |
| 2021/0126992 A1 | 4/2021 | Jung et al. |
| 2021/0143871 A1 | 5/2021 | Ho et al. |
| 2022/0352628 A1 | 11/2022 | Olsson |

FOREIGN PATENT DOCUMENTS

| | | |
|---|---|---|
| WO | 2012/008771 A2 | 1/2012 |
| WO | 2016/163842 A1 | 10/2016 |
| WO | 2020/011714 A1 | 1/2020 |
| WO | 2021/038459 A1 | 3/2021 |
| WO | 2021/085937 A1 | 5/2021 |

OTHER PUBLICATIONS

ETSI TS 138 331 V15.2.1 (Jun. 2018) 5G; NR; Radio Resource Control (RRC); Protocol specification (3GPP TS 38.331 version 15.2.1 Release 15) (Year: 2018).*

International Search Report dated Aug. 4, 2022, issued in International Application No. PCT/KR2022/006328.

REMCOM, "mmWave Channel Modeling with Diffuse Scattering in an Office Environment" (https://www.remcom.com/examples/2017/6/22/5g-mmwave-channel-modeling-with-diffuse-scattering-in-an-office-environment), Jun. 22, 2017.

3GPP TS 38.331 V15.12.0, 3rd Generation Partnership Project, Technical Specification Group Radio Access Network, NR, Radio Resource Control (RRC) protocol specification, (Release 15), Jan. 6, 2021.

Vikram R. Anreddy, "Indoor MIMO Channels with Polarization Diversity: Measurements and Performance Analysis", School of Electrical and Computer Engineering, Georgia Institute of Technology, Apr. 12, 2006.

* cited by examiner

ELECTRONIC DEVICE WITH ANTENNAS AND METHOD OF THE SAME

CROSS-REFERENCE TO RELATED APPLICATION(S)

This application is a continuation application, claiming priority under § 365(c), of an International application No. PCT/KR2022/006328, filed on May 3, 2022, which is based on and claims the benefit of a U.S. Provisional application Ser. No. 63/186,405, filed on May 10, 2021, in the U.S. Patent and Trademark Office, and of a Korean patent application number 10-2021-0102559, filed on Aug. 4, 2021, in the Korean Intellectual Property Office, the disclosure of each of which is incorporated by reference herein in its entirety.

TECHNICAL FIELD

The disclosure relates to an electronic device including antennas and a method thereof.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a "Beyond 4G Network" communication system or a "Post long term evolution (LTE)" system.

The 5G communication system is considered to be implemented in ultrahigh frequency millimeter wave (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

According to the prior art, due to low scattering channel characteristics of 5G communication, an electronic device for performing 5G communication may fail to use spatial MIMO and may have to use polarization MIMO. In this case, the spatial MIMO may support two or more layers, while the polarization MIMO may support a maximum of two layers, thereby limiting the processing capacity and data throughput of the electronic device for performing 5G communication.

Aspects of the disclosure are to address at least the above-mentioned problems and/or disadvantages and to provide at least the advantages described below. Accordingly, an aspect of the disclosure is to provide an electronic device including a MIMO antenna and a method thereof.

Another aspect of the disclosure is to provide a method for controlling operations of a MIMO antenna, based on various pieces of information of an electronic device including the MIMO antenna, and the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a plurality of antennas, a communication circuit, and a processor operatively connected to the communication circuit, wherein the processor is configured to transmit capability information of the electronic device to a base station, transmit channel state information measured based on a reference signal received through the plurality of antennas from the base station, receive antenna control information determined based on at least one of the capability information and the channel state information from the base station, and drive the plurality of antennas by selecting one of a polarization MIMO mode and a spatial MIMO mode based on the antenna control information.

In accordance with another aspect of the disclosure, a method of an electronic device including a plurality of antennas is provided. The method includes transmitting capability information of the electronic device to a base station, transmitting channel state information measured based on a reference signal received through the plurality of antennas from the base station, receiving antenna control information determined based on at least one of the capability information and the channel state information from the base station, and driving the plurality of antennas by selecting one of a polarization MIMO mode and a spatial MIMO mode based on the antenna control information.

In accordance with another aspect of the disclosure, a method of a base station is provided. The method includes receiving capability information of an electronic device including a plurality of antennas, receiving channel state information from the electronic device, determining antenna control information for selecting one of a polarization MIMO mode and a spatial MIMO mode to drive the plurality of antennas of the electronic device based on at least one of the capability information and the channel state information, and transmitting the antenna control information.

Advantageous Effects of Invention

An electronic device according to various embodiments disclosed herein may control operations of a MIMO antenna, based on various pieces of information of an electronic device including a MIMO antenna, such that the MIMO antenna operates efficiently, thereby improving the throughput.

An electronic device according to various embodiments disclosed herein may adaptively control operations of a MIMO antenna in a polarization MIMO mode or spatial MIMO mode according to the situation, based on various pieces of information of an electronic device including a MIMO antenna, such that the MIMO antenna operates efficiently, thereby improving the throughput.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the description will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
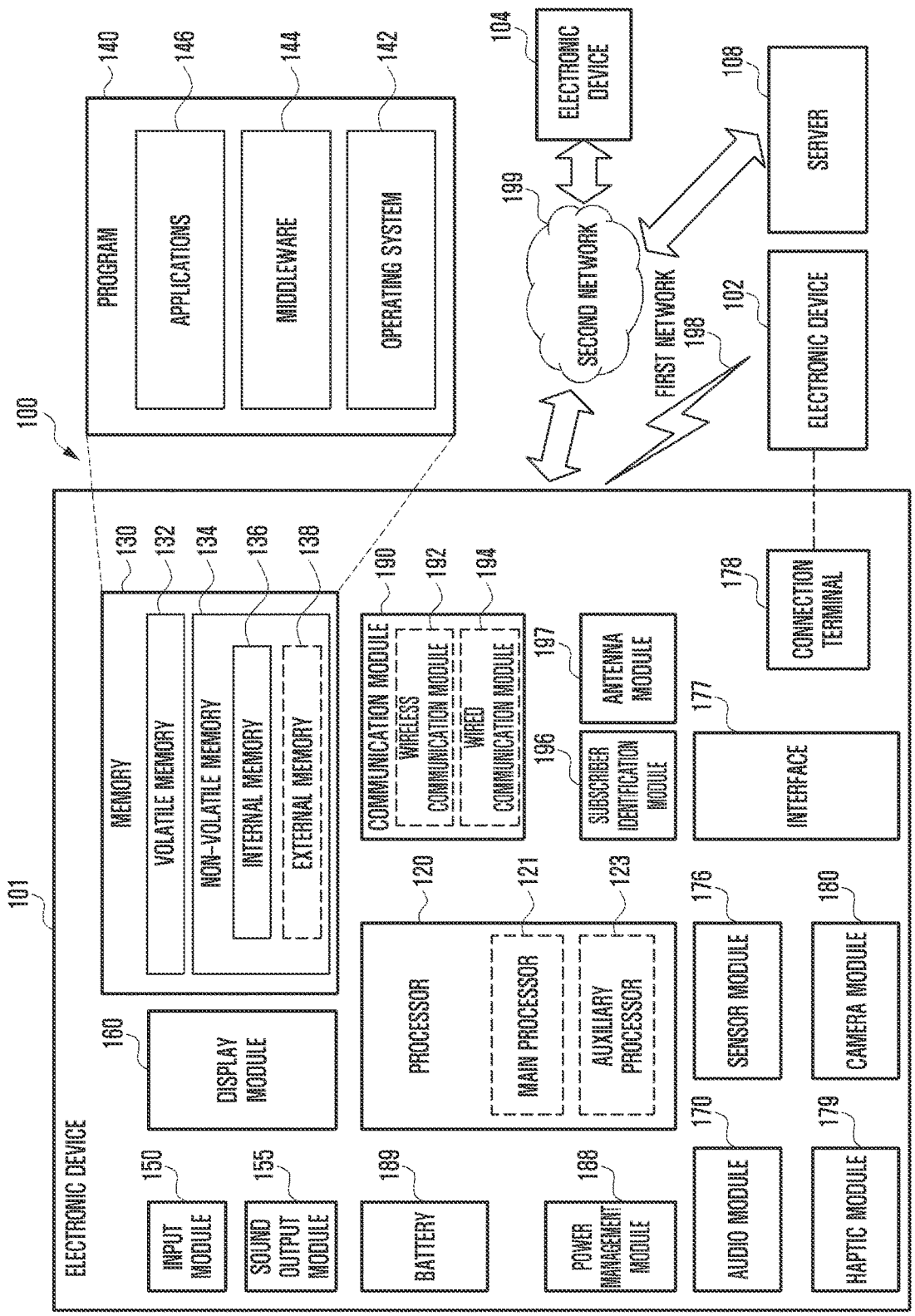
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external member 138.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
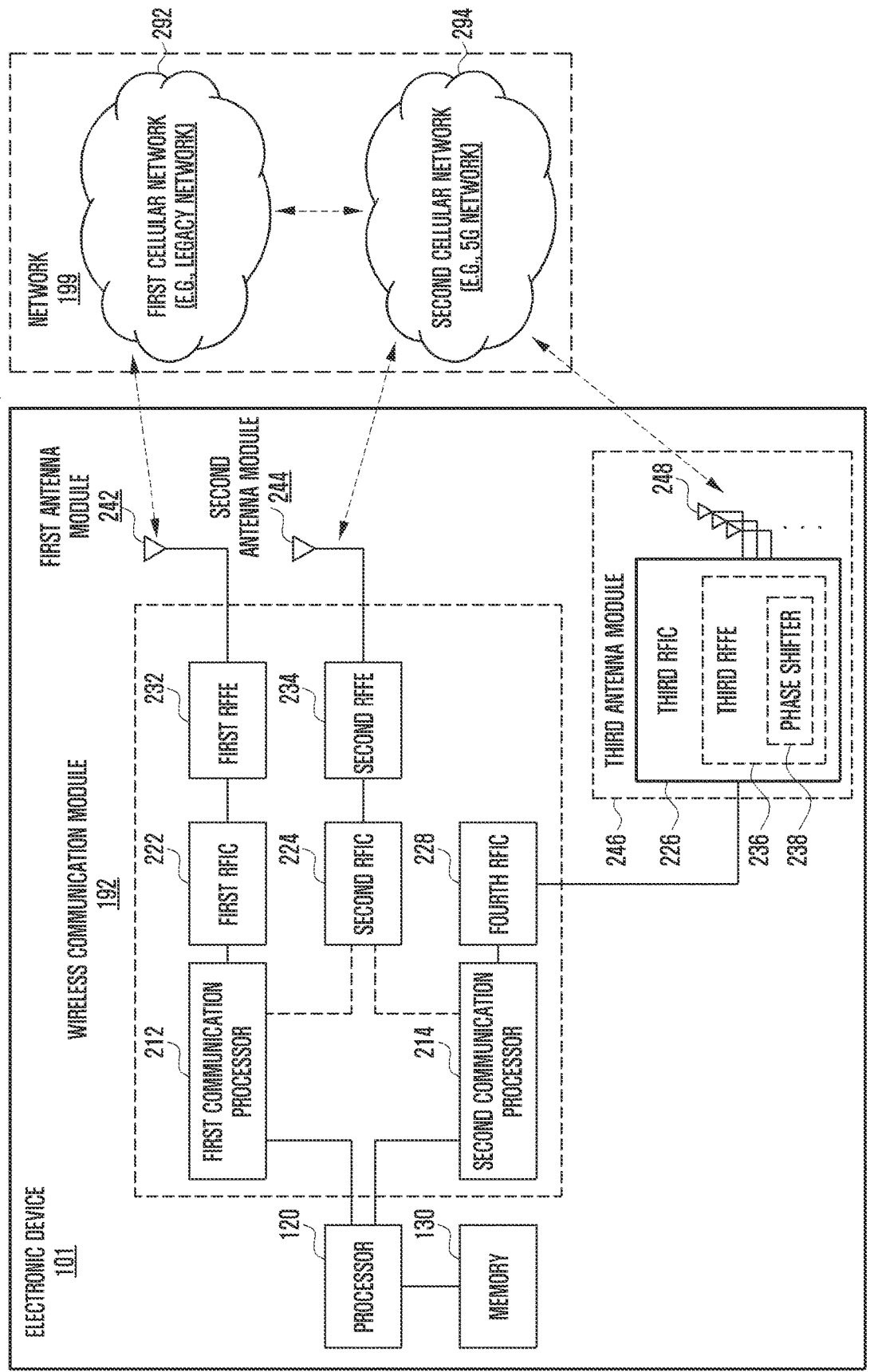
FIG. 2 is a block diagram of an electronic device for supporting legacy network communication and 5G network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel According to various embodiments, the first cellular network may be a legacy network including a $2^{nd}$ generation (2G), $3^{rd}$ generation (3G), 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
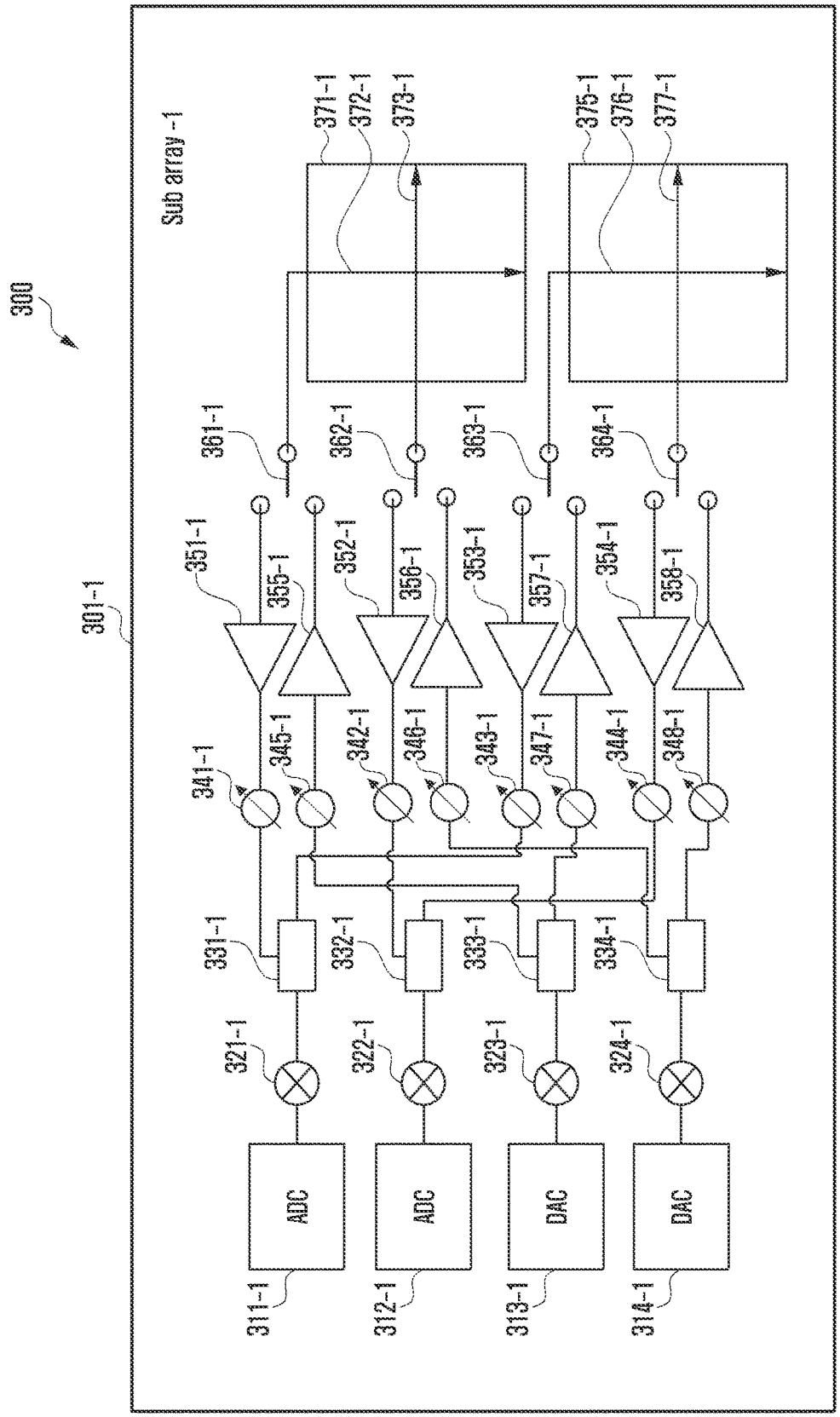
FIGS. 3A and 3B are block diagrams of an antenna module according to various embodiments of the disclosure.
Figure 3B:
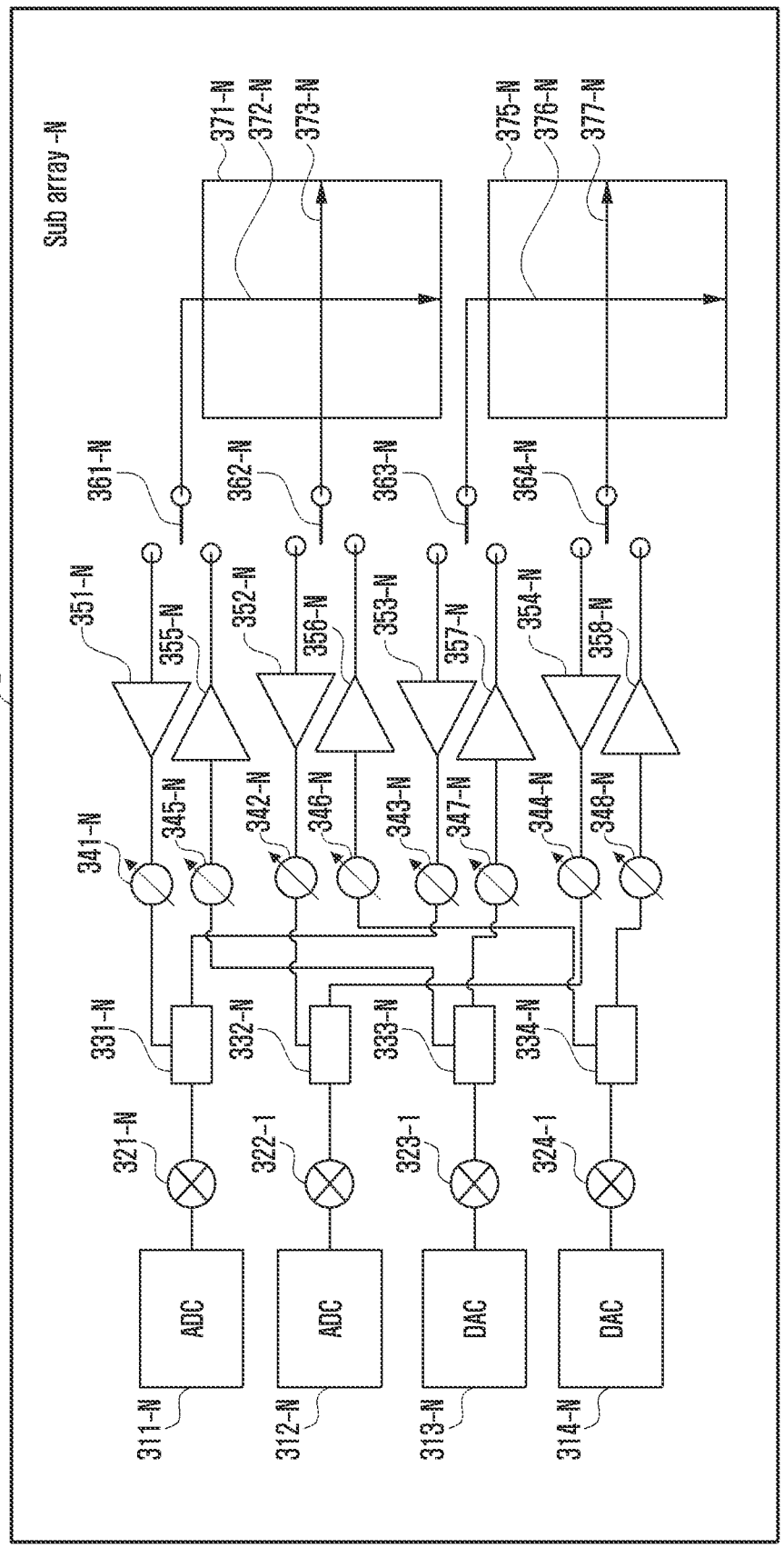

FIGS. 3A and 3B are block diagrams of an antenna module 300 (e.g., the third antenna module 246 of FIG. 2) of an electronic device (e.g., the electronic device 101 of FIG. 1) according to various embodiments of the disclosure.

Referring to FIGS. 3A and 3B, the antenna module 300 according to an embodiment of the disclosure may include a plurality of antenna sub-arrays 301-1, . . . , and 301-N. One or more antenna sub-arrays of the antenna module 300 may be implemented in the form of an independent module in which components are disposed on one circuit board. Each of the elements X-1 described with reference to FIG. 3A has a corresponding element X-N illustrated in FIG. 3B.

Each of the plurality of antenna sub-arrays 301-1, . . . , and 301-N may include a plurality of antenna elements 371-1 and 375-1, . . . , 371-N and 375-N, respectively. FIG. 3A illustrates an example in which each antenna sub-array (e.g., first antenna sub-array 301-1) includes two antenna elements (e.g., antenna elements 371-1 and 375-1), but various embodiments of the disclosure are not limited thereto, and the number of antenna elements included in each antenna sub-array may be two or more. The plurality of antenna elements 371-1, 375-1, . . . , 371-N, 375-N may be antenna elements capable of both transmitting and receiving signals.

the structure of the first antenna sub-array 301-1 will be described as an example, and each of the plurality of antenna sub-arrays 301-1, . . . , and 301-N may include the same or similar structure.

The first antenna sub-array 301-1 may include a plurality of antenna elements (e.g., the first antenna element 371-1 and the second antenna element 375-1). An example in which one antenna sub-array 301-1 includes two antenna elements is illustrated, but this is only an example; according to another embodiment of the disclosure, the antenna sub-array 301-1 may be implemented to include two or more antenna elements.

Each of the antenna elements 371-1 or 375-1 may include one vertical polarization antenna 372-1 or 376-1 and one horizontal polarization antenna 373-1 or 377-1. For example, in each of the antenna elements 371-1 or 375-1, the vertical polarization antennas 372-1 or 376-1 and the horizontal polarization antennas 373-1 or 377-1 may be implemented as polarization patch antennas orthogonal to each other.

In each of the antenna elements 371-1 or 375-1, the vertical polarization antennas 372-1 or 376-1 and the horizontal polarization antennas 373-1 or 377-1 may configure separate signal transmission paths by including independent power supplies to implement the polarization MIMO mode.

The first antenna sub-array 301-1 may include, as a transmission path, a mixer 323-1 and/or 324-1 that outputs an RF signal by mixing an analog signal output from a digital-to-analog converter (DAC) (first DAC 313-1 and/or second DAC 314-1) with a reference signal, a divider 333-1 and/or 334-1 that divides the RF signal output from the mixer 323-1 and/or 324-1, a phase shifter 345-1, 346-1, 347-1 and/or 348-1 for shifting the phase of the RF signal output from the divider 333-1 and/or 334-1, and a power amplifier (PA) 355-1, 356-1, 357-1, and 358-1 that amplifies each transmit signal output from the phase shifter 345-1, 346-1, 347-1 and/or 348-1. For example, in the transmission path, the signal output from the first DAC 313-1 may be transmitted through the vertical polarization antennas 372-1 and 376-1 of the first antenna element 371-1 and the second antenna element 375-1, and the signal output from the second DAC 314-1 may be transmitted through horizontal polarization antennas 373-1 and 377-1 of the first antenna element 371-1 and the second antenna element 375-1.

The first antenna sub-array 301-1 may include, as a reception path, low noise amplifiers (LNA) 351-1, 352-1, 353-1, and 354-1 that remove noise and amplify the received signal, phase shifters 341-1, 342-1, 343-1, and 344-1 for shifting the phase of the signal output from the low-noise amplifiers 351-1, 352-1, 353-1, and 354-1, and/or combiners 331-1 and 332-1 for combining the signals output from the phase shifter 341-1, 342-1, 343-1 and/or 344-1, mixers 321-1 and 322-1 for mixing the RF signal output from the combiners 331-1 and 332-1 with a reference signal to output a baseband signal or an IF signal, and/or analog-to-digital converters (ADC) first ADC 311-1 and second ADC 312-1 converting an analog signal output from the mixers 321-1 and 322-1 into a digital signal. For example, in the reception path, the first ADC 311-1 may receive signals received through the vertical polarization antennas 372-1 and 376-1 of the first antenna element 371-1 and the second antenna element 375-1, and the second ADC 312-1 may receive signals received through the horizontal polarization antennas 373-1 and 377-1 of the first antenna element 371-1 and the second antenna element 375-1.

According to an embodiment of the disclosure, the Tx/Rx switch (e.g., Tx/Rx switches 361-1, 362-1, 363-1, and 364-1) may selectively connect one of the power amplifier (PA) 355-1, 356-1, 357-1, and 358-1 or the low noise amplifier 351-1, 352-1, 353-1, and 354-1 with the antenna element 371-1 and/or 375-1 to form a transmission path or a reception path, thereby transmitting a transmission RF signal output from the power amplifier (PA) 355-1, 356-1, 357-1, and 358-1 to the antenna element or transmitting an RF signal received from the antenna element to the low noise amplifier 351-1, 352-1, 353-1, and 354-1.

The first antenna sub-array 301-1 may further include a Tx/Rx switch 361-1 capable of selectively connecting a transmission or reception path between the power amplifier (PA) 355-1 or the low noise amplifier (LNA) 351-1 and the vertical polarization antenna 372-1 of the antenna element 371-1. The first antenna sub-array 301-1 may further include a Tx/Rx switch 362-1 capable of selectively connecting a transmission or reception path between the power amplifier (PA) 356-1 or the low noise amplifier (LNA) 352-1 and the horizontal polarization antenna 373-1 of the antenna element 371-1.

The first antenna sub-array 301-1 may further include a Tx/Rx switch 363-1 capable of selectively connecting a transmission or reception path between the power amplifier (PA) 357-1 or the low noise amplifier (LNA) 353-1 and the vertical polarization antenna 376-1 of the antenna element 375-1. According to an embodiment, the first antenna sub-array 301-1 may further include a Tx/Rx switch 364-1 capable of selectively connecting a transmission or reception path between the power amplifier (PA) 358-1 or the low noise amplifier (LNA) 354-1 and the horizontal polarization antenna 377-1 of the antenna element 375-1.

According to an embodiment, the antenna module 300 may include mixers 321-1, 322-1, 323-1, and 324-1 to transmit and receive signals of a high frequency band (e.g., about 15 GHz to about 100 GHz) in the electronic device 101. For example, the antenna module 300 may convert a baseband or IF band signal into an RF signal of about 15 GHz to 100 GHz by mixing a reference signal for up-converting/down-converting and a transmission signal or a reception signal using the mixers 321-1, 322-1, 323-1, and 324-1, or conversely, may convert the RF signal of about 15 GHz to 100 GHz into the baseband or IF signal.

According to an embodiment, each of the dividers 333-1 and 334-1 or the combiners 331-1 and 332-1 may divide, for example, one transmission signal into two transmission signals, and combine the two reception signals into one reception signal.

The phase shifters 345-1, 346-1, 347-1, and 348-1 may shift, for example, the phase of corresponding one of the four transmission RF signals output from the dividers 333-1 and 334-1. For example, the first phase shifter 345-1 may shift the phase of the first transmission RF signal output from the divider 333-1 and apply the same to the first power amplifier 355-1. As another example, the fourth phase shifter 348-N may shift the phase of the fourth transmission RF signal output from the distributor 334-N and apply the same to the fourth power amplifier 358-N.

The power amplifiers 355-1, 356-1, 357-1, and 358-1 may amplify and output, for example, power of the transmission RF signal provided from at least one corresponding phase shifter among the phase shifters 345-1, 346-1, 347-1, and 348-1. For example, the first power amplifier 355-1 may amplify and output power of the first transmission RF signal provided from the first phase shifter 345-1. As another example, the fourth power amplifier 358-1 may amplify and output power of the fourth transmission RF signal provided from the fourth phase shifter 348-1.

The transmission RF signal output by at least one of the power amplifiers 355-1, 356-1, 357-1, and 358-1 may be applied to at least one vertical polarization antenna 372-1 and 376-1 or horizontal polarization antenna 373-1 and 377-1 among the antenna elements 371-1 and 375-1.

At least one of the low-noise amplifiers 351-1, 352-1, 353-1, and 354-1 may output, for example, a received RF signal provided from a vertical polarization antenna 372-1 and 376-1 or a horizontal polarization antenna 373-1 and 377-1 of at least one of the antenna elements 371-1 and 375-1 by low noise amplification. The received RF signal output by at least one of the low noise amplifiers 351-1, 352-1, 353-1, and 354-1 may be applied to at least one of the phase shifters 341-1, 342-1, 343-1, and 344-1.

At least one of the phase shifters 341-1, 342-1, 343-1, and 344-1 may shift, for example, a phase of at least one received RF signal output from at least one of the low noise amplifiers 351-1, 352-1, 353-1, and 354-1 to be applied to the combiners 331-1 and 332-1. The combiners 331-1 and 332-1 may combine at least one reception signal applied from the phase shifters 341-1, 342-1, 343-1, and 344-1 into one reception signal and transmit the same to the mixers 321-1 and 322-1. The mixers 321-1 and 322-1 may mix the applied RF reception signal with a reference signal to output a down-converted IF signal.

Figure 4:
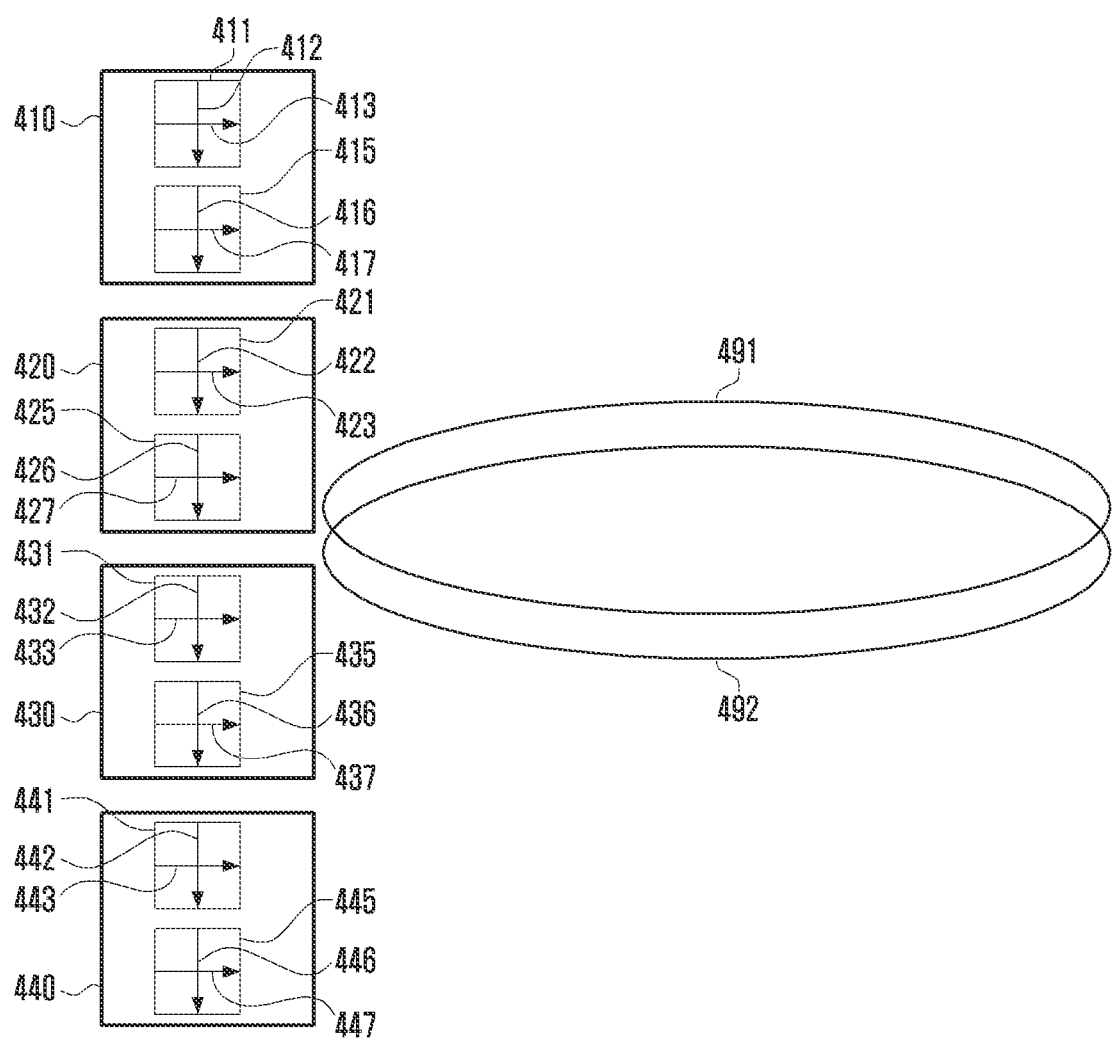
FIG. 4 is a conceptual diagram illustrating an operation of a MIMO antenna according to a polarization MIMO mode according to an embodiment of the disclosure.

FIG. 4 is a conceptual diagram illustrating an operation of a MIMO antenna according to a polarization MIMO mode according to an embodiment of the disclosure.

Referring to FIG. 4, antenna sub-arrays 410, 420, 430, and 440 (e.g., antenna sub-arrays 301-1, . . . of FIG. 3A) of an antenna module (e.g., the antenna module 300 of FIG. 3) may include antenna elements 411 and 415, 421 and 425, 431 and 435, and 441 and 445 (e.g., the antenna elements 371-1, 375-1, . . . , 375-N), respectively. FIG. 4 illustrates four antenna sub-arrays 410, 420, 430 and 440 and eight antenna elements, but the disclosure is not limited thereto.

Each of the antenna elements 411 and 415, 421 and 425, 431 and 435, and 441 and 445 included in the antenna sub-arrays 410, 420, 430 and 440 may operate in, for example, a 2-layer polarization MIMO mode, and accordingly, support 1×8 beamforming including a vertical polarization signal stream and a horizontal polarization signal stream, thereby obtaining a high beamforming gain.

In the antenna sub-arrays 410, 420, 430, and 440, according to the polarization MIMO mode, one or more antenna sub-arrays 410, 420, 430, and 440 may transmit or receive one signal stream 491 through vertical polarization antenna elements 412, 416, 422, 426, 432, 436, 442 and/or 446 and transmit or receive another signal stream 492 through horizontal polarization antenna elements 413, 417, 423, 427, 433, 437, 443 and/or 447.

Figure 5:
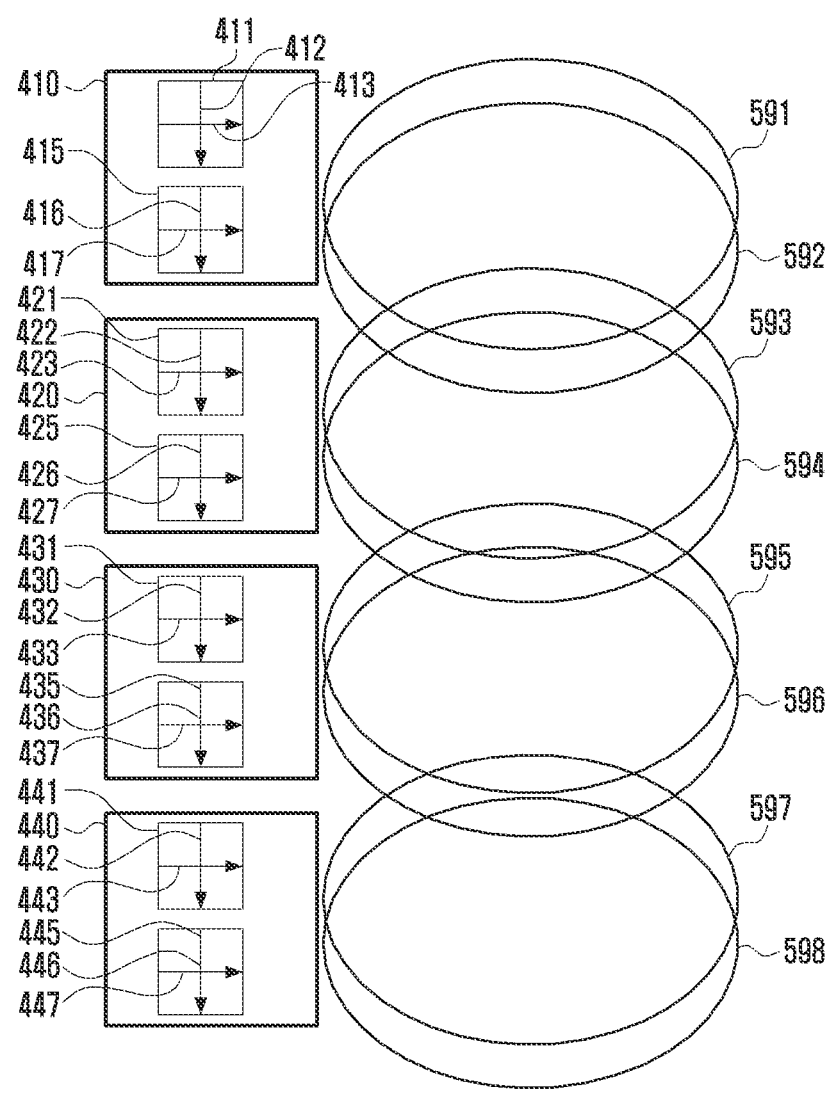
FIG. 5 is a conceptual diagram illustrating an operation of a MIMO antenna according to a spatial MIMO mode according to an embodiment of the disclosure.

FIG. 5 is a conceptual diagram illustrating an operation of a MIMO antenna according to a spatial MIMO mode according to an embodiment of the disclosure.

Referring to FIG. 5, antenna sub-arrays (e.g., the antenna sub-arrays 410, 420, 430, and 440 of FIG. 4) of an antenna module (e.g., the antenna module 300 of FIG. 3) may include antenna elements 411 and 415, 421 and 425, 431 and 435, and 441 and 445 (e.g., the antenna elements 371-1, 375-1, . . . , 375-N), respectively. FIG. 5 illustrates four antenna sub-arrays 410, 420, 430 and 440 and eight antenna elements, but the disclosure is not limited thereto.

According to an embodiment of the disclosure, the antenna sub-arrays 410, 420, 430, and 440 of the antenna module 300 may operate in a spatial MIMO mode.

Each of the antenna sub-arrays 410, 420, 430, and 440 may operate as one MIMO layer, and the antenna sub-arrays 410, 420, 430 and 440 of the example including four sub-arrays may support four spatial MIMO layers. Accordingly, the antenna sub-arrays 410, 420, 430, and 440 may support 1×2 beamforming, respectively, thereby enabling beam steering.

According to an embodiment, the spacing between the antenna sub-arrays 410, 420, 430 and 440 and/or the antenna elements 411 and 415, 421 and 425, 431 and 435, and 441 and 445 may be implemented as, for example, $\lambda/2$.

The antenna sub-arrays 410, 420, 430, and 440 may operate in a spatial MIMO mode, and different antenna elements within the same antenna sub-array may operate in a polarization diversity mode. Accordingly, it is possible to compensate for the reduced beamforming gain while securing polarization diversity according to the spatial MIMO operation.

Each of the antenna sub-arrays 410, 420, 430 and 440 may transmit or receive one different signal stream according to the spatial MIMO mode. For example, the first antenna sub-array 410 may transmit or receive one identical signal stream as a vertical polarization signal 591 through the vertical polarization antennas 412 and/or 416, and may transmit or receive one identical signal stream as a horizontal polarization signal 592 through the horizontal polarization antennas 413 and/or 417. The second antenna sub-array 420 may transmit or receive another identical signal stream as a vertical polarization signal 593 through the vertical polarization antennas 422 and/or 426, and may transmit or receive one identical signal stream as a horizontal polarization signal 594 through the horizontal polarization antennas 423 and/or 427. The third antenna sub-array 430 may transmit or receive another identical signal stream as a vertical polarization signal 595 through the vertical polarization antennas 432 and/or 436, and may transmit or receive one identical signal stream as a horizontal polarization signal 596 through the horizontal polarization antennas 433 and/or 437. The fourth antenna sub-array 440 may transmit or receive another identical signal stream as a vertical polarization signal 597 through the vertical polarization antennas 442 and/or 446, and may transmit or receive one identical signal stream as a horizontal polarization signal 598 through the horizontal polarization antennas 443 and/or 447.

According to various embodiments of the disclosure, an electronic device (e.g., the electronic device 101 of FIG. 1) may include a plurality of antennas (e.g., the antenna 248 of FIG. 2, the antenna sub-arrays 301-1, . . . , and 301-N of FIG.

3A or 3B, and antenna arrays 410, 420, 430 and 440 of FIG. 4 or 5), a communication circuit (e.g., the communication module 190 of FIG. 1 or the wireless communication module 192 of FIG. 2), and a processor (e.g., the processor 120 of FIG. 1 or 2) operatively connected to the communication circuit, and the processor may be configured to transmit capability information of the electronic device to a base station (e.g., the server 108 of FIG. 1), transmit channel state information measured based on a reference signal received through the plurality of antennas from the base station, receive antenna control information determined based on at least one of the capability information and the channel state information from the base station, and drive the plurality of antennas by selecting one of a polarization MIMO mode and a spatial MIMO mode based on the antenna control information.

The capability information may be determined to include the number of MIMO layers supported by the plurality of antennas, and the antenna control information may be determined to include the number of MIMO layers less than or equal to the number of MIMO layers.

The processor may be configured to drive the plurality of antennas by selecting the spatial MIMO mode when the number of MIMO layers included in the antenna control information exceeds 2.

The channel state information may be configured to include channel correlation information measured based on the reference signal received through the plurality of antennas.

The antenna control information may be determined based on the capability information and location information of the electronic device.

Figure 6:
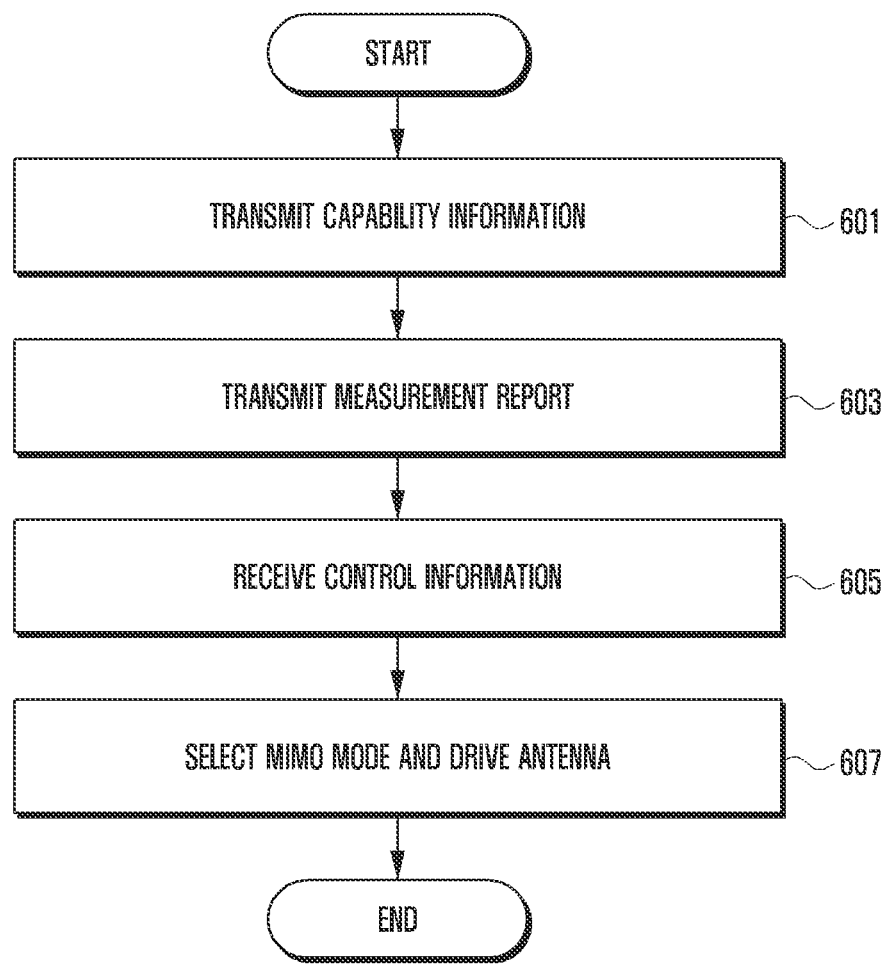
FIG. 6 is a flowchart illustrating an operation of an electronic device including a MIMO antenna according to an embodiment of the disclosure.

FIG. 6 is a flowchart illustrating an operation of an electronic device (e.g., the electronic device 101 of FIG. 1 or 2) including a MIMO antenna (e.g., the antenna module 300 of FIGS. 3A and 3B) according to an embodiment of the disclosure.

Referring to FIG. 6, the electronic device 101 may transmit and receive a signal to and from a base station (e.g., the server 108 of FIG. 1) through the MIMO antenna 300.

One base station 108 may include a digital unit (DU) and one or more radio units (RU). The radio unit may include, for example, a plurality of transmission reception points (TRP).

The electronic device 101 may transmit and receive signals to and from the radio unit, and the radio unit may be connected to the digital unit through, for example, a common public radio interface (CPRI) to manage at least one physical cell. The one physical cell may include a plurality of sub-cells, and each sub-cell may be managed by a respective radio unit. Sub-cells included in the one physical cell may have the same physical cell ID (PCID).

The electronic device 101 may transmit and receive signals to and from the base station 108 through a radio unit managing the connected sub-cell. In the base station 108, the radio unit may transmit a signal received from the electronic device 101 to the digital unit, and receive a signal to transmit the signal to the electronic device 101 from the digital unit.

In operation 601, the electronic device 101 may transmit capability information of the electronic device 101 to the base station 108.

The capability information of the electronic device 101 may include, for example, information on the number of MIMO layers supported by the antenna module 300 of the electronic device 101. For example, in the example of FIG. 5, the capability information may include 4, which is the number of supported MIMO layers. For example, the capability information may be determined based on the hardware structure of the electronic device 101.

When the number of MIMO layers supported based on the capability information of the electronic device 101 exceeds 2, the electronic device 101 may convert the antenna module 300 to the spatial MIMO mode. The electronic device 101 may include the capability information in the UE capability information message, for example, and transmit the included capability information to the base station 108.

Figure 8:
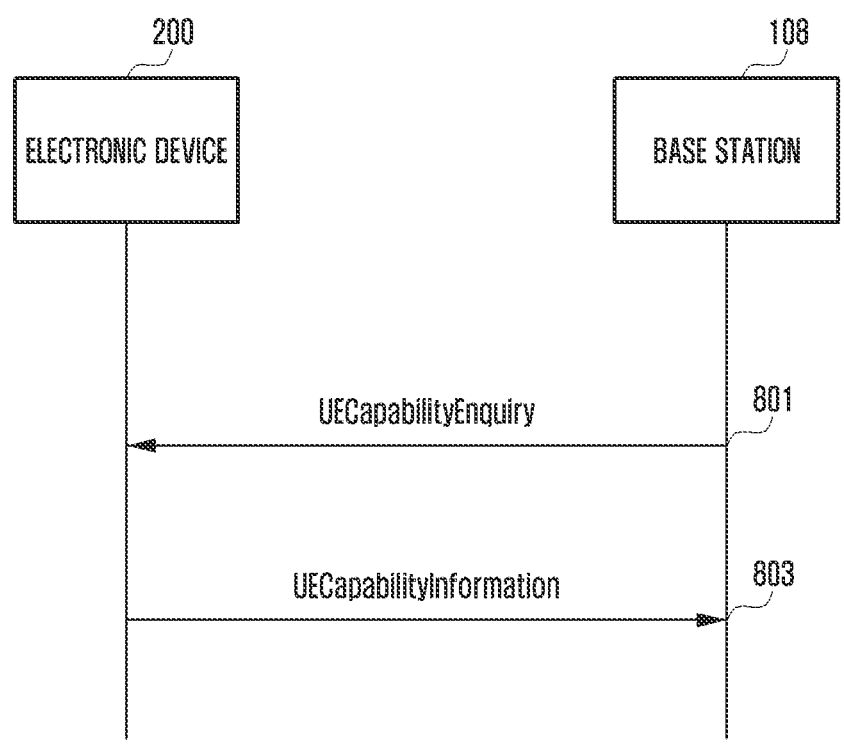
FIG. 8 is a flowchart illustrating an operation for reporting capability information of an electronic device including a MIMO antenna according to an embodiment of the disclosure.

FIG. 8 is a flowchart illustrating an operation for reporting capability information of an electronic device including a MIMO antenna according to an embodiment of the disclosure.

Referring to FIG. 8, the electronic device 101 may transmit the UE capability information message including the capability information described above in operation 803 to the base station 108 in response to the UE capability enquiry received from the base station 108 in operation 801. In this case, the UE capability information message may include a MIMO layer information element indicating capability information.

Referring back to FIG. 6, the electronic device 101 may transmit a measurement report to the base station 108 in operation 603. For example, the electronic device 101 may measure information indicating a channel condition such as RSRP, RSRQ, or channel correlation based on a reference signal (e.g., CSI-RS, SSB) received from the base station 108, and transmit the measured channel state information to the base station 108 as a measurement report.

The electronic device 101 may receive antenna control information from the base station 108 in operation 605.

The base station 108 may determine antenna control information for determining the MIMO antenna mode of the electronic device 101 based on at least one of capability information, channel state information received from the electronic device 101, and/or location information of the electronic device 101 and transmit the determined control information to the electronic device 101. For example, the antenna control information may include the number of MIMO layers. For example, the number of MIMO layers included in the antenna control information may be less than or equal to the number of MIMO layers included in the capability information of the electronic device 101.

The base station 108 may identify location information of the electronic device 101, for example, through installation location information of a radio unit currently communicating with the electronic device 101. The base station 108 may identify whether the location where each radio unit is installed is indoors or outdoors based on identification information such as the ID of the radio unit or the radio unit model ID included in the exchange message between the radio unit and the digital unit.

In addition, the base station 108 may identify the location information of the electronic device 101 through GPS information or GNSS information. In addition, the base station 108 may identify the location information of the electronic device 101 by a positioning technique including NR positioning or Wi-Fi positioning. For example, positioning may include a technique of estimating the location of the electronic device 101 by measuring a distance to the closest entity (e.g., a Wi-Fi access point) on a network communicating with the electronic device 101 or to at least one entity.

The base station 108 may transmit control information to the electronic device 101 through, for example, radio resource control (RRC) signaling. For example, RRC signaling may include control information transmission through information elements such as a physical downlink shared channels (PDSCH)-Config information element (IE), a PDSCH-ServingCellConfig IE, and a physical uplink shared channel (PUSCH)-ServingCellConfig IE.

The channel environment may be changed according to the location of the electronic device 101.

Figure 7:
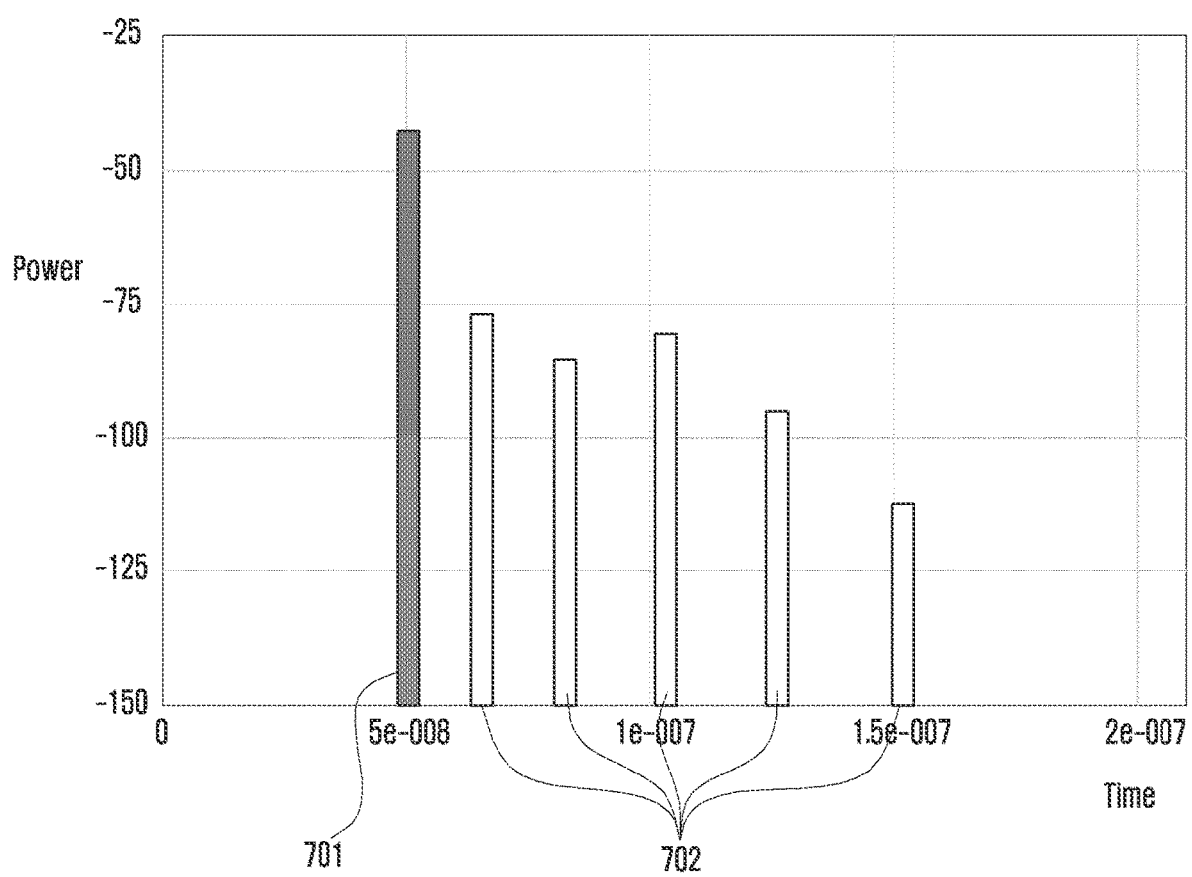
FIG. 7 is a graph illustrating an example of a channel environment of an electronic device including a MIMO antenna according to an embodiment of the disclosure.

FIG. 7 is a graph illustrating an example of a channel environment of an electronic device including a MIMO antenna according to an embodiment of the disclosure.

Referring to FIG. 7, when the location of the electronic device 101 is indoors, for example, after the time when the mmWave band (e.g., 73.5 GHz) transmission signal 701 reaches it may be seen that a sufficient amount of signals 702 due to scattering, diffusion, or reflection reaches the multi-pass path. Such a multi-pass may be further increased in a 5G communication environment of, for example, a 28 GHz or 39 GHz signal band. Accordingly, in this case, a sufficient data throughput may be achieved even if the antenna module is implemented through spatial MIMO mode with relatively low antenna gain.

When the location of the electronic device 101 is indoors, the base station 108 may configure the number of MIMO layers exceeding two, as antenna control information of the electronic device 101 based on the capability information of the electronic device 101 and transmit the antenna control information to the electronic device 101. Accordingly, the electronic device 101 may drive the antenna module 300 in the spatial MIMO mode.

If the base station 108 analyzes the received channel state information of the electronic device 101 and determines that a multi-pass occurs in excess of the reference amount, such as an object-dense area such as a plurality of buildings, the base station 108 may configure the number of MIMO layers exceeding two as antenna control information of the electronic device 101 based on the capability information of the electronic device 101 and transmit the antenna control information to the electronic device 101. Accordingly, the electronic device 101 may drive the antenna module 300 in the spatial MIMO mode.

Referring back to FIG. 6, in operation 607, the electronic device 101 may select a MIMO antenna mode based on antenna control information received from the base station 108 and drive the antenna module 300 based on the same.

When the number of MIMO layers included in the antenna control information exceeds 2 (e.g., 4 layers), the electronic device 101 may drive the antenna module 300 in the spatial MIMO mode.

According to an embodiment, the electronic device 101 may drive the antenna module 300 in one of a polarization MIMO mode or a space MIMO mode according to antenna control information received from the base station 108. For example, when the electronic device 101 drives the antenna module 300 in the polarization MIMO mode and the number of MIMO layers included in the antenna control information exceeds 2, the electronic device may drive the antenna module 300 by changing to the spatial MIMO mode to operate with the number of MIMO layers corresponding to the antenna control information. For example, when the electronic device 101 drives the antenna module 300 in the polarization MIMO mode and the number of MIMO layers included in the antenna control information is 2 or less, the electronic device may drive the antenna module 300 by maintaining the polarization MIMO mode to operate with the number of MIMO layers corresponding to the antenna control information.

Figure 9:
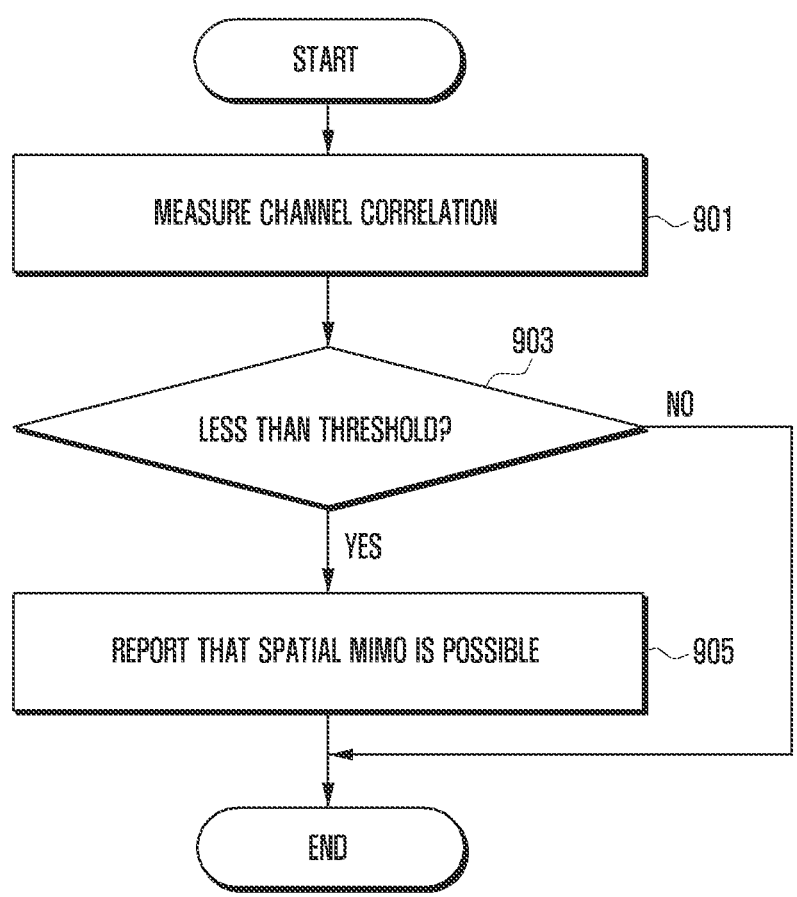
FIG. 9 is a flowchart illustrating operation control of a MIMO antenna based on channel information of an electronic device including a MIMO antenna according to an embodiment of the disclosure.

FIG. 9 is a flowchart illustrating operation control of a MIMO antenna 300 based on channel information of an electronic device (e.g., the electronic device 101 of FIG. 1) including a MIMO antenna (e.g., the antenna module 300 of FIGS. 3A and 3B) according to an embodiment of the disclosure.

Referring to FIG. 9, in operation 901, the electronic device 101 may measure channel correlation between antenna sub-arrays (e.g., antenna sub-arrays 301-1, . . . , and 301-N of FIG. 3A or 3B) of the antenna module 300.

The electronic device 101 may measure a channel correlation based on a reference signal (e.g., CSI-RS) received from a base station (e.g., the server 108 of FIG. 1) through a radio unit such as TRP.

The base station 108 may request the electronic device 101 to measure the channel correlation in order to determine whether the spatial MIMO mode may be implemented, and the electronic device 101 may measure the channel correlation according to the received measurement request and transmit the measured channel correlation to the base station 108.

When it is confirmed that the channel correlation value measured in operation 903 is lower than a specified threshold, the electronic device 101 may determine that the spatial MIMO is possible in the channel environment.

When the channel correlation is low, the electronic device 101 may report to the base station 108 that spatial MIMO is possible in operation 905.

The electronic device 101 may determine a rank indicator (RI) based on a channel correlation and report the determined rank indicator to the base station 108. For example, when the channel correlation value is less than or equal to a specified threshold value, the RI may be determined as a value exceeding 2 and reported to the base station 108.

When spatial MIMO is configured according to the report of the electronic device 101, the base station 108 may configure antenna control information (e.g., the number of MIMO layers) in the CSI report and transmit the same to the electronic device 101 so that the electronic device 101 drives the antenna module 300 in the spatial MIMO mode.

In addition to the channel correlation, the electronic device 101 may further determine a rank indicator (RI) based on the signal quality received by each antenna and report the RI to the base station 108. For example, if the channel correlation value is less than or equal to a specified threshold value and the signal quality received by each antenna is equal to or greater than the specified threshold value, the RI may be determined as a value exceeding 2 and reported to the base station 108.

Figure 10:
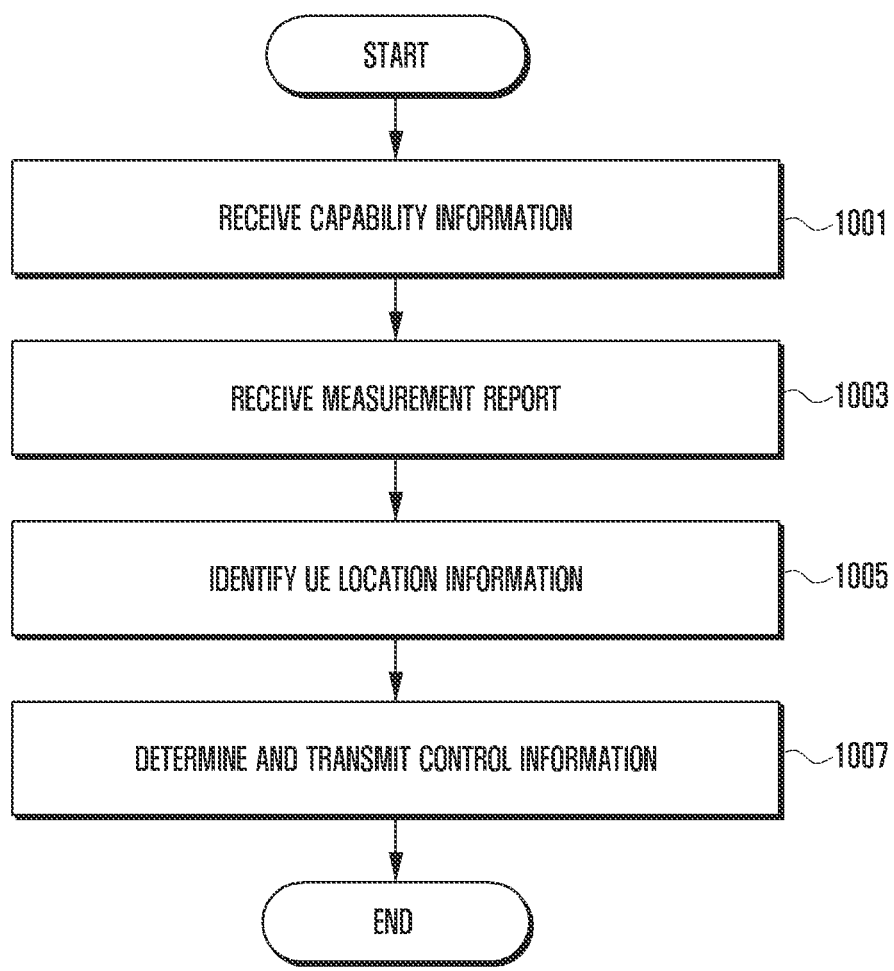
FIG. 10 is a flowchart illustrating an operation of a base station for controlling an operation of an electronic device including a MIMO antenna according to an embodiment of the disclosure.

FIG. 10 is a flowchart illustrating an operation of a base station (e.g., the server 108 of FIG. 1) for controlling an operation of an electronic device including a MIMO antenna (e.g., the antenna module 300 of FIGS. 3A and 3B) according to an embodiment of the disclosure.

Referring to FIG. 10, according to an embodiment, the base station 108 may transmit and receive signals to and from the electronic device 101.

The base station 108 may include a digital unit (DU) and one or more radio units (RU). The radio unit may include, for example, a plurality of transmission reception points (TRP). The base station 108 may transmit and receive signals to and from the electronic device 101 through the radio unit, and the radio unit may be connected to the digital unit through, for example, a CPRI to manage at least one physical cell. The one physical cell may include a plurality of sub-cells, and each sub-cell may be managed by a respective radio unit. Sub-cells included in the one physical cell may have the same physical cell identifier (PCID).

The base station 108 may transmit and receive signals to and from the electronic device 108 through a radio unit that manages a sub-cell to which the electronic device 101 is connected. In the base station 108, the radio unit may transmit a signal received from the electronic device 101 to the digital unit, and may receive a signal to be transmitted to the electronic device 101 from the digital unit and transmit the signal.

In operation 1001, the base station 108 may receive capability information from the electronic device 101. The capability information of the electronic device 101 may include, for example, information on the number of MIMO layers supported by the antenna module 300 of the electronic device 101.

According to an embodiment of the disclosure, the base station 108 may transmit a UE capability enquiry to the electronic device 101, as illustrated in FIG. 8, in order to receive capability information. Accordingly, the base station 108 may receive a UE capability information message including capability information of the electronic device 101 as a response to the UE capability enquiry.

The base station 108 may receive a measurement report from the electronic device 101 in operation 1003. The base station 108 may periodically transmit a reference signal (e.g., CSI-RS) to the electronic device 101, and the electronic device 101 may measure information indicating a channel condition such as RSRP, RSRQ, or channel correlation based on the reference signal (e.g., CSI-RS) received from the base station 108 and transmit a measurement report to the base station 108. Accordingly, the base station 108 may identify channel state information of the electronic device 101 from the received measurement report.

The base station 108 may identify location information of the electronic device 101 in operation 1005. The base station 108 may identify location information of the electronic device 101, for example, through installation location information of a radio unit currently communicating with the electronic device 101. The base station 108 may identify whether the location where each radio unit is installed is indoors or outdoors based on identification information such as the ID of the radio unit or the radio unit model ID included in the exchange message between the radio unit and the digital unit. In addition, the base station 108 may identify the location information of the electronic device 101 through GPS information, GNSS information, NR positioning, or Wi-Fi positioning.

The base station 108 may, in operation 1007, determine antenna control information for determining the MIMO antenna mode of the electronic device 101 based on at least one of capability information, channel state information received from the electronic device 101, and/or location information of the electronic device 101 and transmit the determined control information to the electronic device 101. For example, the antenna control information may include the number of MIMO layers. For example, the number of MIMO layers included in the antenna control information may be less than or equal to the number of MIMO layers included in the capability information of the electronic device 101.

The base station 108 may transmit control information to the electronic device 101 through RRC signaling. For example, RRC signaling may include control information transmission through information elements such as a PDSCH-Config information element (IE), a PDSCH-ServingCellConfig IE, and a PUSCH-ServingCellConfig IE. For example, the base station 108 may transmit antenna control information of the electronic device 101 by using a maxMIMO-Layers parameter value (e.g., the number of MIMO layers) in the PDSCH-Config IE, the PDSCH-ServingCellConfig IE, or the PUSCH-ServingCellConfig IE. As described above, the antenna control information (e.g., maxMIMO-Layers parameter value) of the electronic device 101 may be determined based on at least one of UE capability, channel state information, and/or location information. The maxMIMO-Layers parameter value in the PDSCH-Config IE, the PDSCH-ServingCellConfig IE, or the PUSCH-ServingCellConfig IE may indicate the maximum number of MIMO layers that may be used for PDSCH in the DL bandwidth part (BWP).

The base station 108 may generate control information (e.g., DCI, downlink control information or RRC configuration information) including scheduling information instructing the electronic device 101 to receive or transmit signals by using MIMO layers less than or equal to the maxMIMO-Layers value set as described above and transmit the same to the electronic device 101.

When the location of the electronic device 101 is indoors and the number of MIMO layers included in the capability information of the electronic device 101 exceeds 2, the base station 108 may set, for example, more than two maxMIMO layers value as the antenna control information of the electronic device 101 within the limit of the capability information, and transmit the same to the electronic device 101. Accordingly, the electronic device 101 may drive the antenna module 300 in the spatial MIMO mode.

If the base station 108 analyzes the received channel state information of the electronic device 101 and determines that a multi-pass occurs in excess of the reference amount, for example, such as an object-dense area such as a plurality of buildings, the base station 108 may configure the number of MIMO layers exceeding two as antenna control information of the electronic device 101 based on the capability information of the electronic device 101 and transmit the antenna control information to the electronic device 101. Accordingly, the electronic device 101 may drive the antenna module 300 in the spatial MIMO mode.

When the sub-cell connected to the electronic device 101 is changed due to movement of the electronic device 101, etc., the base station 108 may identify information on the changed sub-cell through the radio unit managing the changed sub-cell of the electronic device 101, and when the connected radio unit is also changed according to the sub-cell change, the base station may perform the above-described operations again through the changed radio unit to configure antenna control information of the electronic device 101 and transmit the antenna control information to the electronic device 101. Accordingly, the MIMO mode of the electronic device 101 may be maintained or changed.

Figure 11:
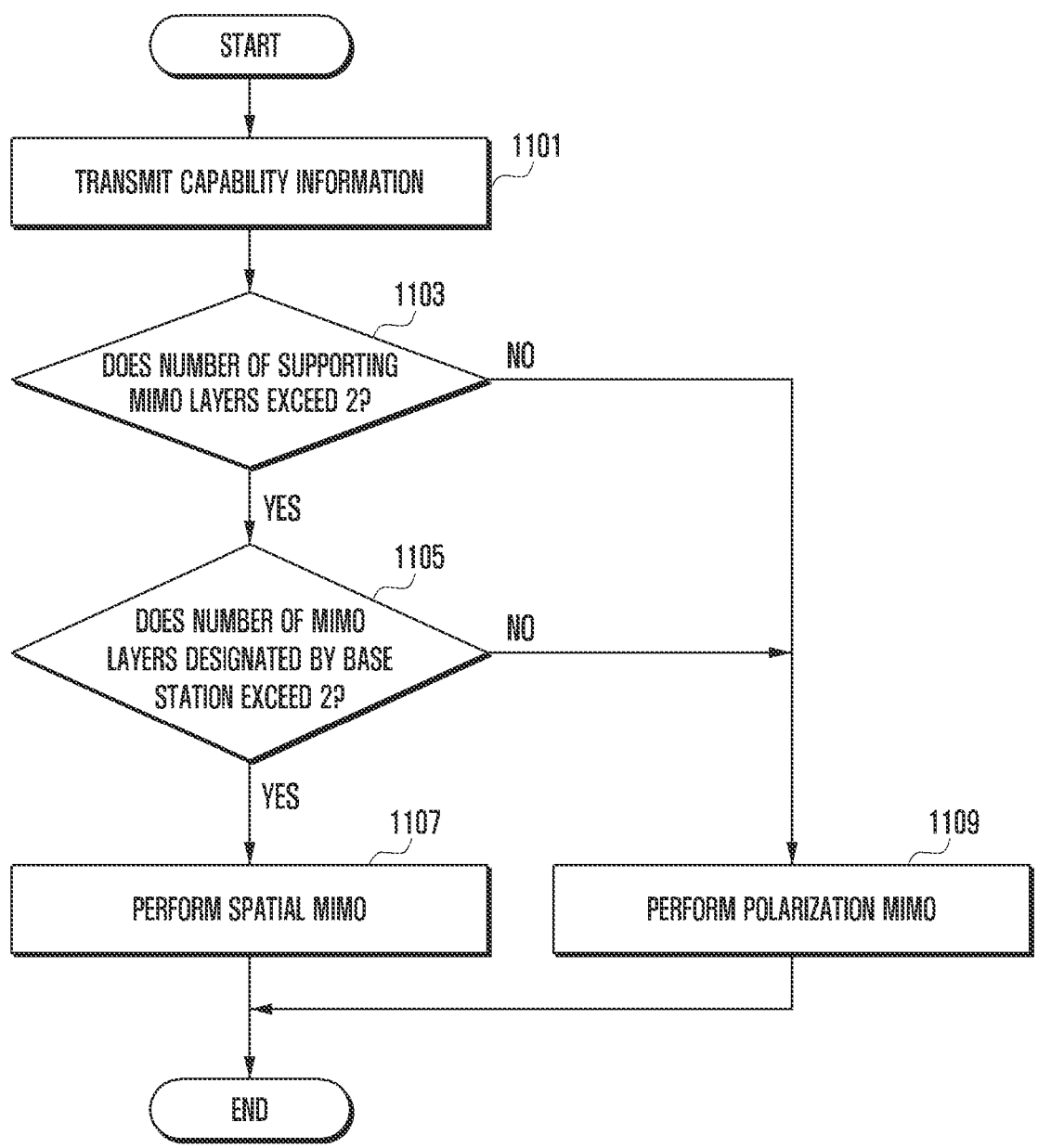
FIG. 11 is a flowchart illustrating an operation of an electronic device including a MIMO antenna according to an embodiment of the disclosure.

FIG. 11 is a flowchart illustrating an operation of an electronic device (e.g., the electronic device 101 of FIG. 1 or 2) including a MIMO antenna (e.g., the antenna module 300 of FIGS. 3A and 3B) according to an embodiment of the disclosure. Hereinafter, descriptions overlapping with those described with reference to FIGS. 3A and 3B may be omitted.

Referring to FIG. 11, the electronic device 101 may transmit and receive signals to and from a base station (e.g., the server 108 of FIG. 1) through the MIMO antenna 300. The electronic device 101 may transmit and receive signals to and from the base station 108 through a radio unit that manages the connected sub-cell. In the base station 108, the radio unit may transmit a signal received from the electronic device 101 to the digital unit, and may receive a signal to be transmitted to the electronic device 101 from the digital unit and transmit the signal.

In operation 1101, the electronic device 101 may transmit capability information of the electronic device 101 to the base station 108. The capability information of the electronic device 101 may include information on the number of MIMO layers supported by the antenna module 300 of the electronic device 101. The electronic device 101 may include the capability information in the UE capability information message, for example, and transmit the included capability information to the base station 108.

In operation 1103, the electronic device 101 may identify whether the number of MIMO layers supported based on the capability information exceeds 2.

The electronic device 101 may determine whether the number of MIMO layers designated by the base station exceeds 2 based on antenna control information received from the base station 108 in operation 1105. The base station 108 may determine antenna control information for determining the MIMO antenna mode of the electronic device 101 based at least in part on capability information received from the electronic device 101, location information (or location information of the radio unit communicating with the electronic device 101) of the electronic device 101, and/or signal quality reported by the electronic device 101, and may transmit the determined control information to the electronic device 101. For example, the antenna control information may include the number of MIMO layers designated by the base station. For example, the number of MIMO layers included in the antenna control information may be less than or equal to the number of MIMO layers included in the capability information of the electronic device 101.

When the number of MIMO layers based on the antenna control information received from the base station 108 in operation 1105 exceeds 2, the electronic device 101 may drive the antenna module 300 in the spatial MIMO mode in operation 1107. Alternatively, when the number of MIMO layers designated based on the antenna control information received from the base station 108 in operation 1105 does not exceed 2, the electronic device 101 may drive the antenna module 300 in the polarization MIMO mode in operation 1109.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a plurality of antennas;
a communication circuit; and
a processor operatively connected to the communication circuit, wherein the processor is configured to:
transmit capability information of the electronic device to a base station, wherein the capability information includes a number of multiple-input multiple-output (MIMO) layers supported by the plurality of antennas,
measuring a channel condition using a reference signal received through the plurality of antennas from the base station,
transmit a measurement report including channel state information indicating the channel condition measured using the reference signal,
receive antenna control information determined based on the capability information and the channel state information from the base station, wherein the antenna control information designates a number of MIMO layers to be operated by the plurality of antennas, and
drive the plurality of antennas by selecting one of a polarization MIMO mode and a spatial MIMO mode by operating sub-arrays of the plurality of antennas corresponding to the number of MIMO layers designated by the antenna control information.

2. The electronic device of claim 1,
wherein the number of MIMO layers included in the antenna control information is less than or equal to the number of MIMO layers supported by the plurality of antennas.

3. The electronic device of claim 2, wherein the processor is further configured to drive the plurality of antennas by selecting the spatial MIMO mode when the number of MIMO layers included in the antenna control information exceeds 2.

4. The electronic device of claim 1, wherein the channel state information is configured to include channel correlation information measured based on the reference signal received through the plurality of antennas.

5. The electronic device of claim 1, wherein the processor is further configured to drive the plurality of antennas in the spatial MIMO mode by operating each of the sub-arrays of the plurality of antennas as one MIMO layer capable of transmitting or receiving one different signal stream, and by operating different antenna elements within the same sub-array in a polarization diversity mode.

6. A method of an electronic device including a plurality of antennas, the method comprising:
transmitting capability information of the electronic device to a base station, wherein the capability information includes a number of multiple-input multiple-output (MIMO) layers supported by the plurality of antennas;
measuring a channel condition using a reference signal received through the plurality of antennas from the base station;
transmitting a measurement report including channel state information indicating the channel condition measured using the reference signal;
receiving antenna control information determined based on the capability information and the channel state information from the base station, wherein the antenna control information designates a number of MIMO layers to be operated by the plurality of antennas; and
driving the plurality of antennas by selecting one of a polarization MIMO mode and a spatial MIMO mode by operating sub-arrays of the plurality of antennas corresponding to the number of MIMO layers designated by the antenna control information.

7. The method of claim 6,
wherein the number of MIMO layers included in the antenna control information is less than or equal to the number of MIMO layers supported by the plurality of antennas.

8. The method of claim 7, wherein the driving of the plurality of antennas comprises selecting the spatial MIMO mode to drive the plurality of antennas when the number of MIMO layers included in the antenna control information exceeds 2.

9. The method of claim 6, wherein the channel state information includes channel correlation information measured based on the reference signal received through the plurality of antennas.

10. The method of claim 6, further comprising:

driving the plurality of antennas in the spatial MIMO mode by operating each of the sub-arrays of the plurality of antennas as one MIMO layer capable of transmitting or receiving one different signal stream, and operating different antenna elements within the same sub-array in a polarization diversity mode.

11. A method of a base station, the method comprising:

receiving capability information of an electronic device including a plurality of antennas, wherein the capability information includes a number of multiple-input multiple-output (MIMO) layers supported by the plurality of antennas;

receiving a measurement report, from the electronic device, measured by the electronic device using a reference signal transmitted through the plurality of antennas to the electronic device, wherein the measurement report includes channel state information indicating a channel condition measured using the reference signal;

determining antenna control information for selecting one of a polarization MIMO mode and a spatial MIMO mode to drive the plurality of antennas of the electronic device based on the capability information and the channel state information, wherein the antenna control information designates a number of MIMO layers to be operated by the plurality of antennas of the electronic device; and transmitting the antenna control information for the electronic device to drive the plurality of antennas by operating sub-arrays of the plurality of antennas corresponding to the number of MIMO layers designated by the antenna control information.

12. The method of claim 11, further comprising obtaining location information of the electronic device.

13. The method of claim 12, wherein the base station includes at least one radio unit, and wherein the base station obtains location information of the radio unit as location information of the electronic device based on an identifier of the radio unit connected to the electronic device.

14. The method of claim 13, wherein the antenna control information specifies the spatial MIMO mode when it is determined that the electronic device is located indoors according to the location information.

15. The method of claim 11, wherein the transmitting of the antenna control information includes transmitting the antenna control information to the electronic device through radio resource control (RRC) signaling.

16. The method of claim 11, further comprising:

transmitting a message requesting the capability information of the electronic device, wherein the capability information of the electronic device is received by being included in a response message to the request message.

17. The method of claim 11, wherein the antenna control information causes the electronic device to drive the plurality of antennas in the spatial MIMO mode by operating each of the sub-arrays of the plurality of antennas as one MIMO layer capable of transmitting or receiving one different signal stream, and by operating different antenna elements within the same sub-array in a polarization diversity mode.

18. The method of claim 17, wherein the antenna control information specifies the spatial MIMO mode when the number of MIMO layers included in the antenna control information exceeds 2.

19. The method of claim 11, wherein the channel state information includes channel correlation information measured based on a reference signal received through the plurality of antennas.

20. The method of claim 19, wherein the antenna control information is specifies the spatial MIMO mode when the channel correlation of the plurality of antennas is less than or equal to a specified threshold.

* * * * *